(12) United States Patent
Quero et al.

(10) Patent No.: US 12,055,019 B2
(45) Date of Patent: Aug. 6, 2024

(54) ENERGY GENERATION DEVICE FOR A PIGGING TOOL IN A PIPELINE

(71) Applicant: Halliburton Energy Services, Inc., Houston, TX (US)

(72) Inventors: Philippe Quero, Houston, TX (US); David Bennett, Houston, TX (US); Jeremy C. Nicholson, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 18/083,192

(22) Filed: Dec. 16, 2022

(65) Prior Publication Data

US 2024/0200427 A1    Jun. 20, 2024

(51) Int. Cl.
*E21B 41/00* (2006.01)
*E21B 23/08* (2006.01)
*E21B 23/10* (2006.01)
*F16L 55/26* (2006.01)

(52) U.S. Cl.
CPC .......... *E21B 41/0085* (2013.01); *E21B 23/08* (2013.01); *E21B 23/10* (2013.01); *F16L 55/26* (2013.01)

(58) Field of Classification Search
CPC ....... E21B 23/00; E21B 41/0085; F16L 55/26
See application file for complete search history.

(56) References Cited

U.S. PATENT DOCUMENTS

| | | | |
|---|---|---|---|
| 4,218,923 A | 8/1980 | Brauer et al. | |
| 4,676,310 A | 6/1987 | Scherbatskoy et al. | |
| 11,604,169 B2 | 3/2023 | Du | |
| 2004/0129456 A1* | 7/2004 | Vail, III | E21B 23/00 175/57 |
| 2007/0194948 A1* | 8/2007 | Hall | E21B 17/003 340/854.8 |
| 2008/0156477 A1* | 7/2008 | Aivalis | E21B 41/0085 166/53 |
| 2011/0203394 A1 | 8/2011 | Tinlin | |
| 2013/0240197 A1* | 9/2013 | Hallundbæk | E21B 23/00 166/66.4 |
| 2020/0131883 A1 | 4/2020 | Arsalan et al. | |
| 2022/0275692 A1 | 9/2022 | Al-mousa | |
| 2022/0345006 A1 | 10/2022 | Soliman | |

OTHER PUBLICATIONS

International Patent Application No. PCT/US2022/054239, International Search Report and the Written Opinion mailed Sep. 4, 2023, 12 pages.
Hu et al., "Dynamic Characteristics of a Novel Self-Drive Pipeline Pig", IEEE Transactions on Robotics, vol. 21, Issue 5, Oct. 2005, pp. 781-789.

* cited by examiner

*Primary Examiner* — Brad Harcourt
(74) *Attorney, Agent, or Firm* — Kilpatrick Townsend & Stockton LLP

(57) ABSTRACT

A pigging tool may include a housing positionable in a pipeline. The housing may define a bypass channel that extends along an axis that is nonparallel to a longitudinal axis of the housing. An energy generation device can be positioned in the bypass channel of the housing such that fluid is receivable by the energy generation device to generate energy for the pigging tool. Further, an energy storage device may store energy generated from the energy generation device. The energy storage device may provide the pigging tool with energy to perform one or more operations in the pipeline.

20 Claims, 5 Drawing Sheets

ENERGY GENERATION DEVICE FOR A PIGGING TOOL IN A PIPELINE

TECHNICAL FIELD

The present disclosure relates generally to pipeline operations and, more particularly (although not necessarily exclusively), to energy generation devices for pigging tools in a pipeline.

BACKGROUND

Wellbores and pipelines can be created to produce, store, and deliver hydrocarbons, such as oil and gas, and other material from subterranean geological formations. Wellbore and pipeline operations may involve monitoring production, storage, and delivery of hydrocarbons. Tools may include logging tools or other inspection tools. An inspection tool or device may include one or more modules that inspect and diagnose a pipeline or contents thereof. The one or more modules may use excessive amounts of energy, limiting a distance and an inspection capability or quality of the inspection tool. Generating energy for traversing longer distances or for powering one or more modules while under a pipeline operation can be a challenge for inspection tools.

DETAILED DESCRIPTION

Figure 1:
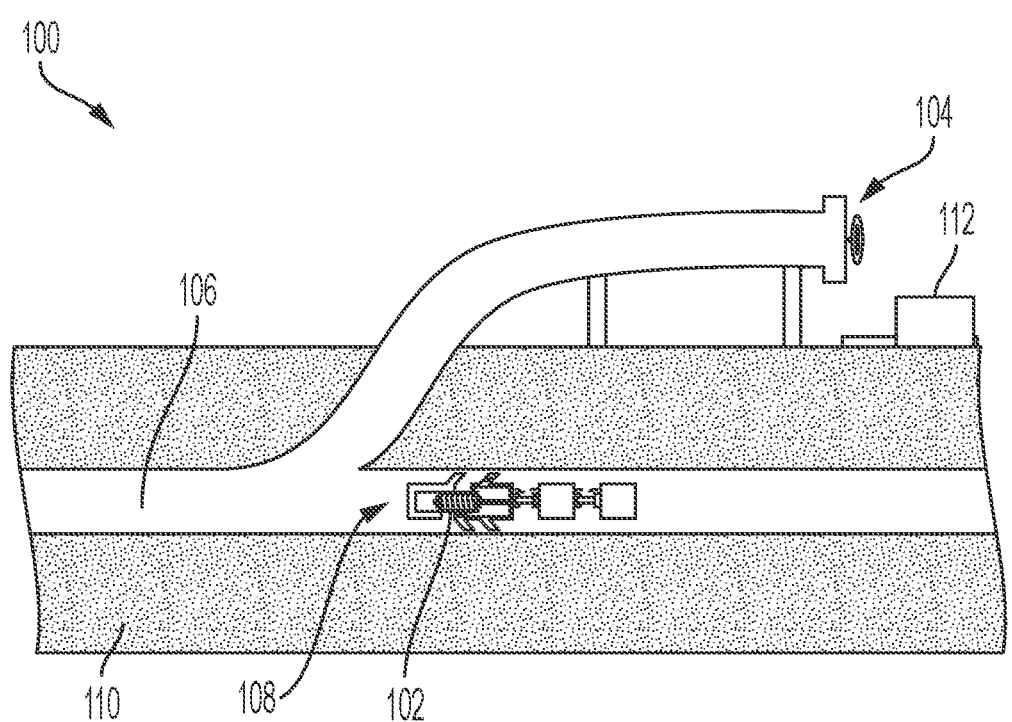
FIG. 1 is a schematic of a pigging tool with an energy generation device deployed within a pipeline according to one example of the present disclosure.

Certain aspects and examples of the present disclosure relate to a pigging tool that includes an energy generation device for generating energy for the pigging tool while the pigging tool is positioned in a pipeline. A pigging tool may include an in-line inspection tool that can travel independently through at least a portion of a pipeline. As the pigging tool travels along the pipeline, the pigging tool may monitor and record quality-control data relating to oil or gas in the pipeline, or relating to features of the pipeline, etc. Additionally or alternatively, the pigging tool may monitor pipeline health data to ensure proper sealing, storage, or transport of the oil or gas. An energy generation device may include any device that can generate energy from the environment such that the pigging tool that includes the energy generation device may be energetically self-reliant. For example, the energy generation device may use a flow of fluid, friction generated from braking, or the like as a source of energy to provide power to the pigging tool or an energy storage device such as a battery, etc. An energy generation device can be used to provide power to the pigging tool, or to the energy storage device that powers the pigging tool, during a pipeline operation. A pigging tool can be a tethered or autonomous pigging tool. In some examples, autonomous pigging tools can be referred to as smart pigs.

A pipeline can be exposed to harsh conditions in a hydrocarbon well environment that may lead to corrosion, over-bending, cracks, or other anomalies. It may be desirable to calculate an accurate service life and other conditions of the pipeline. Accurate service life and other health data of the pipeline may provide a prediction of when the pipeline may need to be repaired or replaced. Calculating the accurate service life or other health metrics of the pipeline may involve an enhanced inspection operation. For example, the enhanced inspection operation may include inspecting a set of layers of a wall of the pipeline. Inspecting the layers of the wall of the pipeline may provide early detection of corrosion, over-bending, cracks, or other anomalies. The enhanced inspection may be completed by an in-line inspection device.

The in-line inspection device may be any device or tool that can be positioned inside a pipeline for performing inspections from within the pipeline. In some examples, some sections of the pipeline can be underwater or buried under a subterranean formation. Examples of the in-line inspection device may include free-swimming smart pigs, tethered pigs, robotic pigs, as well as other devices and tools that can be positioned inside the pipeline for performing inspections of the pipeline from within the pipeline. A pig, or pigging tool, may be a device used to perform tubing or wellbore inspection tasks. A free-swimming smart pig can be a device that moves along the pipeline along with a flow of central bore fluid to conduct the inspection tasks. A tethered pig can be tethered to a well platform using an umbilical, and the tethered pig can conduct the inspection tasks from within the pipeline. In an example, the umbilical can control the tethered pig along the pipeline to allow the tethered pig to conduct the inspection tasks. A robotic pig can include a self-propulsion unit that enables the robotic pig to move along the pipeline autonomously to conduct the inspection tasks. In an example, the pig may be powered independently from the umbilical and may alternatively be powered by a battery or a battery pack. The in-line inspection device may be able to inspect multiple metallic layers over multiple miles of the pipeline. Inspecting the pipeline with the in-line inspection device, such as a pigging tool, may mitigate or eliminate production flow interruptions and may mitigate or eliminate a risk of damage to the pipeline and other surrounding formations.

A pigging tool can include an energy generation device such that the pigging tool can be energetically self-reliant. Such an energy generation device may allow for untethered pigging tools to traverse longer distances in the pipeline. Additionally, an energy generation device positioned in the pigging tool may also allow for more modules to be coupled to the pigging tool. This may allow for greater data collection and pipeline monitoring capabilities. Positioning an energy generation device in a pigging tool may increase energetic capabilities of the pigging tool during a pipeline operation.

The pigging tool, used for in-line inspections, may rely on lithium batteries, or other similar batteries, to power sensors used to record measurements for inspection and diagnostic purposes. However, lithium batteries, or other energy storage devices, may present several limitations for use. The limitations may include logistical and storage limitations, as well as limited energy storage capabilities. To overcome the limitations, an energy generation device that can be positioned in the pigging tool may be used. An energy generation device that can generate energy such that it can consistently charge the pigging tool's battery pack during a pipeline operation, while providing the pigging tool with increased energetic capabilities to monitor the pipeline over longer distances may further overcome many limitations. Additionally, the energy generation device may be used to provide the pigging tool with increased energetic capabilities to add additional high-energy sensors without draining the energy storage device, which may include batteries or a battery pack.

An energy generation device may include a wheel responsive to fluid, a turbine, or the like. The turbine may be positioned in a housing of the pigging tool such that fluid, such as oil or gas, can flow through the turbine to generate energy during an in-line pipeline inspection operation. The turbine may be used to directly power the pigging tool or charge the batteries or the battery pack. The battery pack may be positioned in the housing of the pigging tool or may alternatively be positioned in a second housing, or module, electronically connected to the turbine of the pigging tool. The battery pack may also be mechanically or communicatively connected to the turbine of the pigging tool in the housing or in an additional module. Additionally or alternatively, the turbine may be used to power the pigging tool in an absence or presence of the energy storage device or battery. The turbine may be used to power multiple modules, sensors, and devices that the pigging tool may utilize during an in-line operation. The battery pack may be used as an alternative source of energy to power the pigging tool or to deliver diagnostic data and information as a fail-safe back-up for the turbine.

The pigging tool may include features that can direct a fluid to the turbine in the housing. A feature of the pigging tool for directing fluid can include bypass flows, or bypass channels. The bypass channels of the pigging tool may be used to control a velocity of the pigging tool and ensure debris removal from areas surrounding the sensors. A bypass channel may be used to direct the fluid to flow to an opening on the housing of the pigging tool. The energy generation device may be positioned in the housing of the pigging tool. The fluid can be directed to an inlet on the housing and to the energy generation device. Thus, the directed fluid can cause the turbine to rotate, allowing the turbine to generate energy. The energy can be transferred to a capacitor or a battery.

As the fluid flows through the inlet of the housing, directing fluid to the turbine, the fluid may then exit the housing through an outlet of the housing. The inlet and the outlet of the housing may have a filter to filter out heterogenous particles that may damage the turbine or other parts in the housing of the pigging tool. The turbine may be operated remotely, by a trigger in-line, or by a time-delay. An example of a remote can be a magnet on the line that the pigging tool may pass, indicating a pressure signal. An example of a trigger can be that of an anomaly such as flow change, pipeline damage, or moisture in a dry environment. An example of a time-delay operation may include operation of the pigging tool for a predetermined amount of time prior to shutting down. A time-delay operation may also include operating during a certain time throughout the day.

A pigging tool may include three components: a power train, a braking unit, and a diagnostic unit. Other suitable number (e.g., less than three or more than three) of components may be included in the pigging tool. The components may be positioned in a single integrated unit or may be positioned in multiple connected unit modules. The power train, or power module, may include (i) the energy generation device, (ii) cups for directing a flow of fluid to the energy generation device, and (iii) the energy storage device for storing energy generated by the energy generation device. Further, a braking unit or module may include additional cups or other devices that can aid in controlling the velocity of the pigging tool through variable opening. For example, as the cups open away from the housing, the velocity of the pigging tool may be decreased. In other examples, the braking module, when decreasing the velocity of the pigging tool, may forcibly direct a flow of fluid towards the energy generation device. A higher flow of fluid may be correlated to a higher pressure from the flow of fluid in the power generation device. Such an increase in pressure may allow the energy generation device to be activated or to increase energy generation. Additionally, the braking module may autonomously perform a braking operation when the energy of the energy storage device is low. A diagnostic unit or module may include devices, sensors, cameras, artificial intelligence, or other systems of the like for inspecting the pipeline and wellbore surroundings as well as the pipeline contents.

The pigging tool may further include additional diagnostic modules that can collect and generate data and information on geometry, curvature, temperature, and pressure measurements. Additionally, some modules can collect data from metal-loss/corrosion detection, photographic inspection, and crack detection. Some modules may provide deposition measurements, as well as leak, bend, and ovality detection. One or more modules may include a camera, ultrasonic unit, pulse generator, magnetic flux leakage, electronic gauging, gyroscopes, vibration detection devices, and the like. Some modules may have the capability to provide braking power such that velocity is controlled and that the flow of fluid across the turbine is properly altered. For example, reducing the velocity of the pigging tool with the braking unit may correlate to an increase in pressure in the turbine, allowing the turbine to generate more energy. Energy generated from the increase in pressure may charge the energy storage device faster. Other units may include a battery pack that may power the turbine if a low fluid pressure is present. The turbine may be further used to generate a telemetry pulse to allow communication between sensors on a diagnostic module to the pigging tool. In one alternative example, the turbine, powered by a battery, may rotate in alternate directions to allow for a flow of fluid to change direction, such that the turbine can expel debris or otherwise generate potential energy. A pigging tool that is energetically self-reliant may provide for more efficient, high-energy, in-inline inspection operations as well as longer distant displacements inspectable by the pigging tool when compared to a tethered or battery-operated pig.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a pigging tool 108 that includes an energy generation device 102. The pigging tool 108 can be deployed within a pipeline 106 according to one example of the present disclosure. Pipelines may be used to store and transport hydrocarbon fuels such as oil or gas, or other suitable material. In some examples, one or more sections of the pipeline can be underwater, buried under a subterranean formation 110, or the like. The pipeline 106 can include a terrestrial pipeline surrounded by a subterranean formation 110. The pipeline may include an above-surface opening 104 that may be used to install the pigging tool 108 in the pipeline 106. The pigging tool 108 may be at least communicatively coupled to a receiving module 112 external to the pipeline for receiving or transmitting operating instructions, diagnostic data, and other information of the like with respect to the pigging tool 108. In one example, the receiving module 112 may be positioned above ground. The receiving module 112 may alternatively be referred to as an external module. The receiving module 112 external to the pipeline may also be used for receiving pipeline health information. The pipeline 106 may span a large distance such as several continuous miles, several hundred continuous miles, etc. To increase efficiency and reduce a difficulty of monitoring pipeline data, observation tools that can travel at least a portion of a pipeline, such as the pigging tool 108, can be utilized.

A pigging tool lacking the energy generation device 102 may only be capable of properly monitoring small distances due to excessive energy usage by modules for diagnostic and observatory purposes. As a result, pigging tools without the energy generation device 102 may be limited in a distance they are able to traverse as well as limited in a monitoring capability potential in a pipeline. A pigging tool that includes an energy generation device such that the pigging tool becomes energetically self-reliant can power more modules or high-energy modules, can traverse longer distances in the pipeline 106, or a combination thereof. Such an energy generation device may allow for pigging tools to traverse longer distances in the pipeline. Additionally, an energy generation device positioned in a pigging tool may also allow for more modules to be coupled to the pigging tool. This may allow for greater data collection and pipeline monitoring capabilities. Positioning an energy generation device in a pigging tool may increase energetic capabilities of the pigging tool during a pipeline operation. For example, having an energy generation device positioned in a pigging tool may allow the pigging tool to power high-energy modules. Increasing energetic capabilities of the pigging tool 108 may also allow the pigging tool to traverse longer distances in the pipeline 106.

Figure 2:
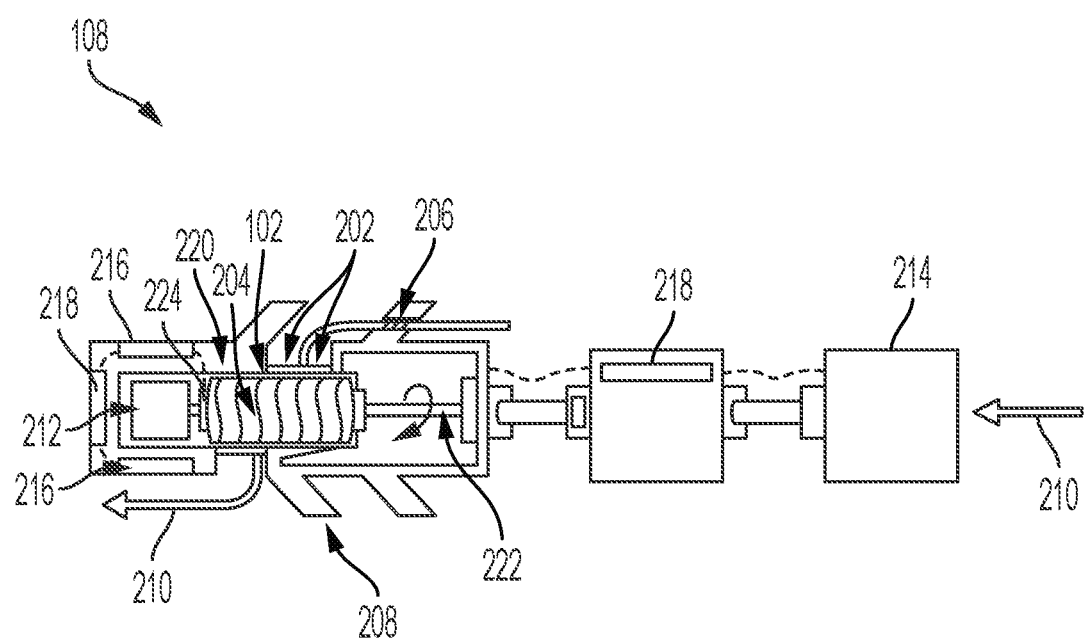
FIG. 2 is a sectional side-view of a pigging tool with an energy generation device including two modules according to one example of the present disclosure.

FIG. 2 is a sectional side-view of a pigging tool 108 with an energy generation device 102 including one or more modules 214 according to one example of the present disclosure. The pigging tool 108, alternatively referred to as a smart pig, can be positioned in the pipeline 106 for pipeline operations. The pigging tool 108 may be tethered to a well platform for receiving power, operating instructions, and other resources of the like. Alternatively, the pigging tool 108 can be an autonomous, untethered pigging tool that can be referred to as a smart pig. The energy generation device 102 can be positioned in a housing 220 of the pigging tool 108 or of an additional module. Energy can be generated from the energy generation device 102, converted, and delivered to an energy storage device 218, or used directly to power the pigging tool. The energy storage device 218 may be positioned in the housing of the pigging tool 108 or may alternatively be positioned in a housing of one of the attached modules. The energy storage device 218 may include any device capable of storing energy for subsequent use. An example of an energy storage device can include a battery or battery pack. The battery, or battery pack, may include lithium or other suitable alkali material and can be at least electronically coupled to the energy generation device 102 for capturing, storing, and providing energy generated. In some examples, the battery pack may be a modular battery system that can include one or more battery packs. The one or more battery packs may include a backup battery pack, a module-specific battery pack (e.g., reserved to power a particular module such as a sensor module, etc.), and the like. The energy generation device 102 may generate and provide energy to the one or more battery packs.

The one or more modules 214 of the pigging tool may include additional inspection tools that can be used during a pipeline operation. The one or more modules 214 may diagnose and provide technical analysis for pipeline issues that may include information on geometry, curvature, temperature, and pressure measurements, and the like. Additionally, some modules can collect data from metal-loss or corrosion detection, photographic inspection, and crack detection. Some modules may provide deposition measurements, as well as leak, bend, and ovality detection. One or more modules may include a camera, ultrasonic unit, pulse generator, magnetic flux leakage, electronic gauging, gyroscopes, vibration detection devices, and the like. Additionally, the one or more modules 214 may serve as additional energy generation devices as well as energy storage devices. The pigging tool 108 can have multiple energy generation devices in the housing of one or more modules such that the pigging tool 108 and the one or more modules 214 can be efficiently powered. Further, a module for braking may be included as part of the pigging tool 108. A braking module on the pigging tool may provide speed control, alteration of flow speed, and other potential benefits of the like.

The energy generation device 102, which can be positioned in the housing of the pigging tool 108, may be or otherwise include a turbine 204. The turbine 204 may be constructed of materials and metals that may be resistant to corrosion and heat. The turbine 204 may rotate about an axle or a shaft 222 having a longitudinal position aligned with a central axis of the housing of the pigging tool 108, though the shaft 222 may otherwise suitably be aligned for facilitating energy generation by the energy generation device 102. One or both end points of the shaft 222 of the turbine 204 may be coupled with a magnet 212. Surrounding the magnet 212 may be one or more coils 216. As the turbine 204 rotates about the shaft 222, the magnet 212 coupled to the shaft may also rotate. Rotation of the magnet 212 in the surrounding coils 216 may generate an electric field. The electric field can be used to generate electric potential energy that can be stored in the energy storage device 218 or used directly by the pigging tool 108. An inverter 224 may be positioned proximally to the turbine 204 and the coils 216 for converting direct current to alternating current to power the pigging tool 108.

The pigging tool 108 may include features which allow a flow of fluid 210 to be directed to the turbine 204. The features may include at least one pair of cups 208 or baffles, which may allow for a fluid to be directed towards the energy generation device 102. The flow of fluid 210 may include a flow of gas or a flow of oil or another fluid. The cups 208 may be positioned external with respect to the housing of the pigging tool at an angle facing the flow of fluid 210 such that the fluid may be redirected or trapped. The cups 208 can be opened or closed such that an amount of the flow of fluid 210 being directed is altered. Altering the amount of the flow of fluid 210 may subsequently alter a speed of the pigging tool. Altering the position angle of the cups 208 such that the flow of fluid 210 is altered can be used for traversing past debris or other anomalous artifacts in the pipeline. Altering the position angle of the cups 208 may also cause the flow of fluid 210 to increase in pressure, which can result in an increased speed of the pigging tool 108.

The cups 208 of the pigging tool 108 may further include a bypass flow or a bypass channel 206. The bypass channel 206 of the cups 208 may traverse and extend through at least one of the cups 208 such that a flow of fluid 210 can traverse past the cups. The bypass channel 206 may be positioned in the cups 208 to allow the flow of fluid 210 to be directed to a bypass channel 202 of the housing 220 different from the bypass channel 206 of the cups. Further, the bypass channel 202 of the housing 220 may traverse and extend through the housing 220 of the pigging tool 108 such that the flow of fluid 210 can traverse through and past the turbine 204. The bypass channel 202 of the housing 220 may include an inlet, which may accept the flow of fluid 210, a portion of the turbine 204, which may rotate upon exposure to the flow of fluid 210, and an outlet or exhaust, which can discharge the flow of fluid 210. In one example, the pigging tool 108 may include multiple turbines, housing bypass channels, cups, and cup bypass channels. The energy generation device 102 may be used to power more than one module when positioned in a pipeline. Diagnostic modules attached to the pigging tool may include a computer device including instructions for performing diagnostic activities. The diagnostic modules may also include a memory device for capturing and storing diagnostic properties and values of the contents of the pipeline, the pigging tool, or the pipeline itself.

Figure 3:
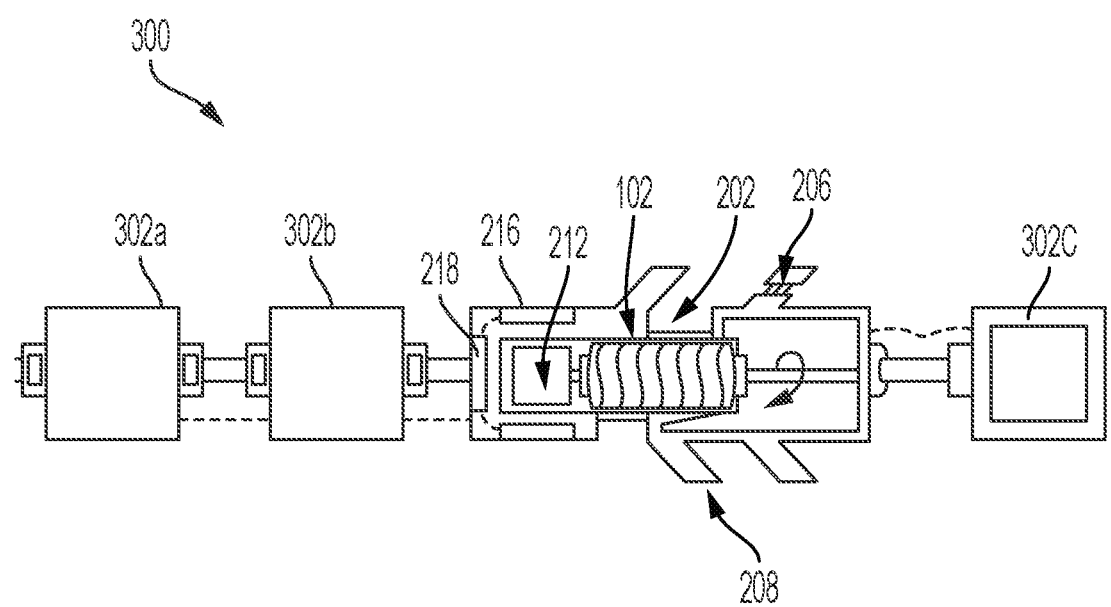
FIG. 3 is a cross-section of a pigging tool with an energy generation device including an altered order of modules including three modules according to one example of the present disclosure.

FIG. 3 is a cross-section of a pigging tool 108 with an energy generation device 102 including an altered order of modules, including multiple modules, 302a, 302b, 302c, according to one example of the present disclosure. As illustrated, the pigging tool 108 may be similar or identical to the pigging tool 108 illustrated and described with respect to FIG. 2. The pigging tool 108 may include more than one module, each module having a purpose in providing braking, diagnostic, energetic operation or other operation of the like. For example, module 302a, 302b, and 302c may be a diagnostic module, braking module, and transmitting module, respectively. The pigging tool 108, alternatively referred to as a smart pig, may include multiple modules attached to each other or to the pigging tool 108. The multiple modules may be connected, attached, or towed to the pigging tool 108 and other modules such that the modules resist separation from the pigging tool or other modules due to a high-pressure or high-debris environment. The multiple modules may further be mechanically, electrically, or communicatively coupled with each other or with the pigging tool 108 such that data, information, energy, and other resources may be transmitted to multiple modules including the receiving module 112 above ground. The receiving module 112 (see FIG. 1) may be communicatively coupled to the pigging tool and may additionally provide the pigging tool with operating instructions. A size of the energy generation device 102 positioned in the housing of the pigging tool 108 may correlate to a number of modules connected to the pigging tool 108.

Figure 4:
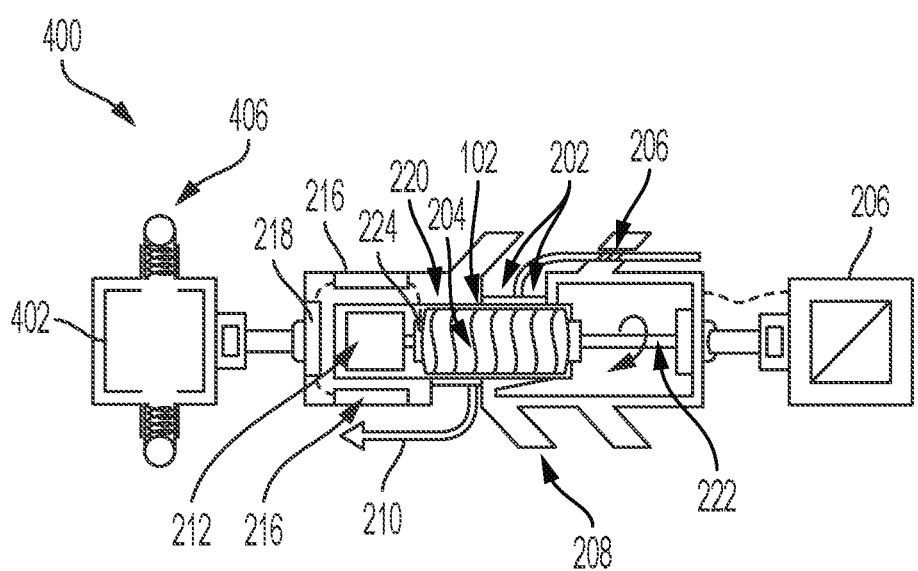
FIG. 4 is a cross-section of a pigging tool with an energy generation device including two modules where one module is a braking module according to one example of the present disclosure.

FIG. 4 is a cross-section of a pigging tool 108 with an energy generation device 102 including two modules where one module is a braking module 402 according to one example of the present disclosure. More than one module may be connected to the pigging tool 108. One or more of the modules may conduct diagnostic operations while one of the modules may transmit collected data or information to the receiving module 112 above ground. Additionally, the pigging tool 108 may include one or more braking modules in addition to other different types of modules. In one example, one of the modules is a braking module 402 for altering or reducing a speed of the pigging tool 108 deployed in a pipeline. The braking module 402 may include one or more systems for braking that includes pads, wheels, cups, or other systems of the like. The one or more systems may use the flow of fluid 210 or a local environment such as a pipeline wall to brake with the braking module. The braking module may further use a friction generated from the systems or the flow of fluid 210 captured from the cups 208 to further generate energy for the pigging tool 108 or the energy storage device 218. In one example, the braking module 406 may deploy wheels outwardly, away from a central axis of the braking module 406 and the pigging tool 108 such that they come into contact with the pipeline wall. The wheels may have induced resistance such that frictional energy can be generated in the wheels of the braking module 402. The braking module 402 can serve as an additional method for braking in addition to altering an opening angle of the cups 208. Further, the braking module 402 may serve as an energy generation device independent of or in conjunction with the energy generation device positioned in the housing of the pigging tool 108. An inverter may be positioned in the housing of the braking module, proximally to the one or more braking systems, for converting direct current to alternating current to power the pigging tool 108. Further, the braking module 406 may include additional cups or other devices that can aid in controlling the velocity of the pigging tool through variable opening. For example, as the cups open away from the housing 220 of the pigging tool 108, the velocity of the pigging tool may be decreased. In other examples, the braking module 406, when decreasing the velocity of the pigging tool, may forcibly direct the flow of fluid 210 towards the energy generation device. A higher flow of fluid may be correlated to a higher pressure from the flow of fluid 210 in the energy generation device 102. Such an increase in pressure may allow the energy generation device 102 to be activated. Additionally, the braking module 406 may autonomously perform a braking operation when the energy of the energy storage device 218 is low.

Figure 5:
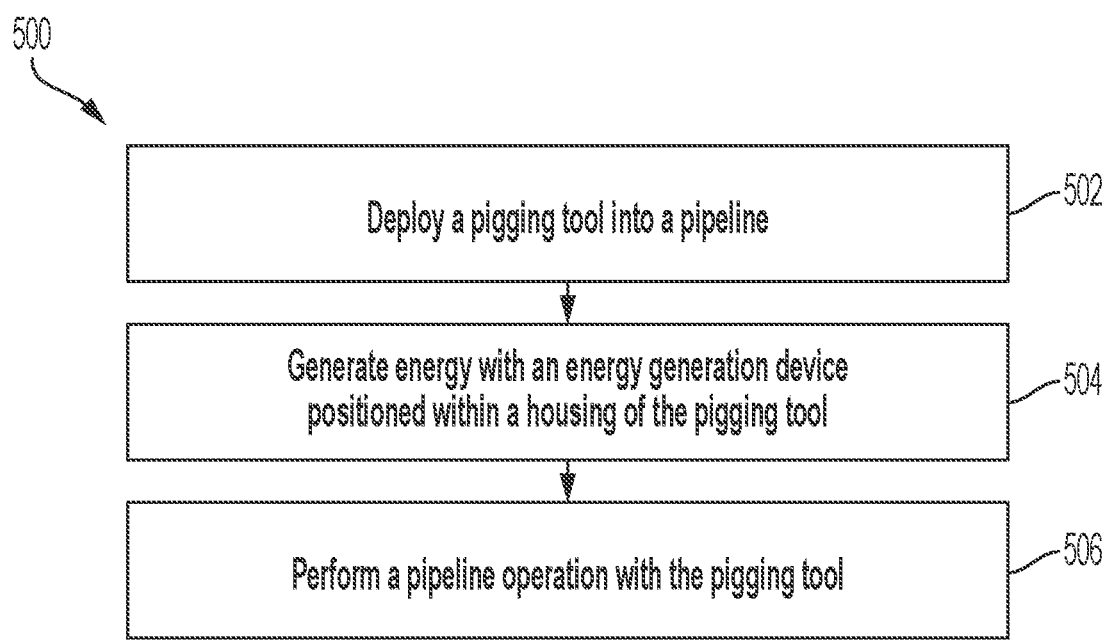
FIG. 5 is a flowchart of a process for using a pigging tool with an energy generation device deployable in a pipeline according to one example of the present disclosure.

FIG. 5 is a flowchart of a process 500 for using a pigging tool with an energy generation device 102 deployable in a pipeline 106 according to one example of the present disclosure. At block 502, a pigging tool is deployed into a pipeline 106 to conduct one or more pipeline operations. The pigging tool 108 may be deployed through an opening 104 in the pipeline positioned above a subterranean formation 110. The pipeline opening 104 may be parallel, perpendicular, or oblique with respect to the pipeline buried underneath the subterranean formation 110. The pigging tool may be tethered above ground.

In block 504, the energy generation device 102 that is positioned in a housing 220 of the pigging tool 108 may be used to generate energy. A pigging tool may encounter a flow of fluid 210 such as a gas, liquid, or oil that can be directed to the cups 208 positioned external to the housing 220 of the pigging tool 108. The cups 208 may then direct the flow of fluid 210 past a bypass channel 206 of the cups 208 that extends through an axis that is nonparallel to the axis of the cups 208. The bypass channel 206 of the cups 208 may provide velocity control for the pigging tool 108. The cups 208 and the bypass channel 206 may also aid in directing a fluid to a bypass channel 202 positioned in the housing 220 of the pigging tool 108. The bypass channel 202 of the housing 220 may extend through an axis that is nonparallel to the axis of the housing of the pigging tool. The energy generation device 102 may be positioned in the bypass channel 202 of the housing 220. In one example, the energy generation device 102 may be a turbine 204. The flow of fluid 210 directed to the bypass channel 202 of the housing 220 by the cups 208 may propagate rotation of the turbine 204. The turbine's shaft 222, attached to a magnet 212, may aid in generating an electric current that can be used to power the pigging tool 108 or charge an energy storage device 218.

In block 506, a pipeline operation is performed with the pigging tool 108. The pipeline operation may vary but may include diagnostic operations for measuring and recording pipeline health data as well as recording and measuring pipeline contents. In one example, the pigging tool 108 may have one or more modules 214 attached or connected to the pigging tool 108. Each of the modules 214 may serve a purpose in performing a pipeline operation. An extensive pipeline operation using a pigging tool 107 with multiple modules may include more than one energy generation device 102 for powering the multiple modules 214.

In some examples, the block 506 may be performed prior to, subsequent to, alternating with, or simultaneously with the block 504. A pipeline operation may be performed with the pigging tool 108 powered by the battery pack such as the energy storage device 218. The pigging tool, when the battery pack energy level is low, may use the energy generation device 102 to recharge the battery pack or directly power the pigging tool 108. The energy generation device may generate energy for the pigging tool 108 before or after performing a pipeline operation. Additionally or alternatively, the energy generation device 102 my intermittently generate energy while the pigging tool 108 performs a pipeline operation.

In some aspects, a pigging tool, a system including a pigging tool, and a method for using the pigging tool in a pipeline operation are provided according to one or more of the following examples:

As used below, any reference to a series of examples is to be understood as a reference to each of those examples disjunctively (e.g., "Examples 1-4" is to be understood as "Examples 1, 2, 3, or 4").

Example 1 is a pigging tool comprising: a housing positionable in a pipeline and defining a bypass channel that extends along an axis that is nonparallel to a longitudinal axis of the housing; an energy generation device positionable in the bypass channel of the housing such that fluid is receivable by the energy generation device to generate energy for the pigging tool; and an energy storage device for storing energy generated from the energy generation device and for providing the pigging tool with energy to perform one or more operations in the pipeline.

Example 2 is the pigging tool of example 1, further comprising at least one pair of cups positionable on an external surface of the pigging tool to direct a fluid to the energy generation device to generate energy, the at least one pair of cups comprising: at least one bypass channel different from the bypass channel of the housing that traverses and extends through one of the at least one pair of cups along an axis that is nonparallel to a longitudinal axis of the at least one pair of cups, positionable for directing fluid to the bypass channel of the housing.

Example 3 is the pigging tool of any of examples 1-2, wherein the at least one pair of cups are adjustable with respect to the housing of the pigging tool to alter an amount of fluid flowing through the at least one bypass channel of one of the at least one pair of cups, and wherein an amount of fluid flowing to the bypass channel of the housing correlates to an amount of energy generated by the energy generation device.

Example 4 is the pigging tool of example 1, wherein the energy generation device is a turbine comprising a shaft that is aligned with the longitudinal axis of the housing, and wherein the turbine is at least electrically coupled to an inverter to generate energy from a fluid directed from an at least one pair of cups.

Example 5 is the pigging tool of any of examples 1 and 4, wherein the energy generation device is electrically coupled to the energy storage device that comprises a battery pack, wherein the battery pack is chargeable by energy generated from the energy generation device, and wherein the battery pack is useable to provide usable power to the pigging tool.

Example 6 is the pigging tool of example 1, wherein the housing is a first module, wherein the pigging tool further comprises a second module that includes a diagnostic tool for collecting and storing pipeline health information.

Example 7 is the pigging tool of any of examples 1 and 6, further comprising a third module comprising a braking module, wherein a velocity of the pigging tool is controllable by the braking module through additional cups, wheels, or braking pads, and wherein friction generated from the braking module is usable for charging a battery pack to power the pigging tool.

Example 8 is a method comprising: deploying, into a pipeline, a pigging tool comprising: a housing positionable in the pipeline and defining a bypass channel that extends along an axis that is nonparallel to a longitudinal axis of the housing; an energy generation device positionable in the bypass channel of the housing such that fluid is receivable by the energy generation device to generate energy for the pigging tool; an energy storage device for storing energy generated from the energy generation device and for providing the pigging tool with energy to perform one or more operations in the pipeline; generating energy with the energy generation device; and performing a pipeline operation with the pigging tool.

Example 9 is the method of example 8, further comprising: directing a fluid, by an at least one pair of cups positioned on an external surface of the pigging tool to the energy generation device, the at least one pair of cups comprising: at least one bypass channel different from the bypass channel of the housing that traverses and extends through one of the at least one pair of cups along an axis that is nonparallel to a longitudinal axis of the at least one pair of cups, the at least one bypass channel positioned for directing fluid to the bypass channel of the housing; storing generated energy, by a battery pack, within an energy storage device coupled electrically to the energy generation device; collecting and storing pipeline health information by an at least one data collecting module; and transmitting pipeline health information electronically to a receiving module external to the pipeline.

Example 10 is the method of any of examples 8-9, further comprising: adjusting the at least one pair of cups directionally with respect to the housing to alter an amount of fluid flowing through the at least one pair of cups wherein altering the amount of fluid flowing correlates to an amount of energy generated by the energy generation device.

Example 11 is the method of any of examples 8-9, wherein the generated energy charges a battery pack in the storage energy device, and wherein the battery pack provides power to the pigging tool.

Example 12 is the method of example 8, wherein the energy generation device is a turbine comprising a shaft that is aligned with the longitudinal axis of the housing, and wherein the turbine is at least electrically coupled to an inverter to generate energy from a fluid directed from an at least one pair of cups.

Example 13 is the method of example 8, wherein the housing is a first module, wherein the pigging tool further comprises a second module that includes a diagnostic tool for collecting and storing pipeline health information.

Example 14 is the method of example 8, further comprising: braking, by a braking module such that a velocity of the pigging tool is controlled by the braking module through additional cups, wheels, or braking pads, and wherein friction generated from the braking module is used for charging a battery pack to power the pigging tool.

Example 15 is a system comprising: a pigging tool comprising: a housing positionable in a pipeline and defining a bypass channel that extends along an axis that is nonparallel to a longitudinal axis of the housing; an energy generation device positionable in the bypass channel of the housing such that fluid is receivable by the energy generation device to generate energy for the pigging tool; an energy storage device for storing energy generated from the energy generation device and for providing the pigging tool with energy to perform one or more operations in the pipeline; and a receiving module positioned external to the pipeline, the receiving module usable for providing operating instructions to the pigging tool and receiving pipeline health information from the pigging tool.

Example 16 is the system of example 15, further comprising at least one pair of cups positionable on an external surface of the pigging tool to direct a fluid to the energy generation device to generate energy, the at least one pair of cups comprising: at least one bypass channel different from the bypass channel of the housing that traverses and extends through one of the at least one pair of cups along an axis that is nonparallel to a longitudinal axis of the at least one pair of cups, the at least one bypass channel positionable for directing fluid to the bypass channel of the housing.

Example 17 is the system of any of examples 15-16, wherein the at least one pair of cups are adjustable with respect to the housing of the pigging tool to alter an amount of fluid flowing through the at least one bypass channel of one of the at least one pair of cups, and wherein an amount of fluid flowing to the bypass channel of the housing correlates to an amount of energy generated by the energy generation device.

Example 18 is the system of example 15, wherein the energy generation device is a turbine comprising a shaft that is aligned with the longitudinal axis of the housing, and wherein the turbine is at least electrically coupled to an inverter to generate energy from a fluid directed from an at least one pair of cups.

Example 19 is the system of example 15, wherein the energy generation device is electrically coupled to the energy storage device that comprises a battery pack, wherein the battery pack is chargeable by energy generated from the energy generation device, and wherein the battery pack is useable to provide usable power to the pigging tool.

Example 20 is the system of example 15, wherein the housing is a first module, wherein the pigging tool further comprises a second module that includes a diagnostic tool for collecting and storing pipeline health information, wherein the pigging tool further comprises a third module that includes a braking module, wherein a velocity of the pigging tool is controllable by the braking module through additional cups, wheels, or braking pads, and wherein friction generated from the braking module is usable for charging a battery pack to power the pigging tool.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A pigging tool comprising:
    a housing positionable in a pipeline and defining a bypass channel that extends along an axis that is nonparallel to a longitudinal axis of the housing;
    an energy generation device positionable in the bypass channel of the housing such that fluid is receivable by the energy generation device to generate energy for the pigging tool;
    an energy storage device for storing energy generated from the energy generation device and for providing the pigging tool with energy to perform one or more operations in the pipeline; and
    at least one pair of cups or baffles positionable on an external surface of the pigging tool to control fluid flow to the energy generation device to generate energy, wherein the at least one pair of cups or baffles comprises a second bypass channel that extends through at least one cup or baffle of the at least one pair of cups or baffles.

2. The pigging tool of claim 1,
    wherein the second bypass channel extends along an axis that is nonparallel to a longitudinal axis of the at least one pair of cups or baffles for directing fluid to the bypass channel of the housing.

3. The pigging tool of claim 2, wherein the at least one pair of cups are adjustable with respect to the housing of the pigging tool to alter an amount of fluid flowing through the second bypass channel, and wherein an amount of fluid flowing to the bypass channel of the housing correlates to an amount of energy generated by the energy generation device.

4. The pigging tool of claim 1, wherein the energy generation device is a turbine comprising a shaft that is aligned with the longitudinal axis of the housing, and wherein the turbine is at least electrically coupled to an inverter to generate energy from a fluid directed from an at least one pair of cups.

5. The pigging tool of claim 4, wherein the energy generation device is electrically coupled to the energy storage device that comprises a battery pack, wherein the battery pack is chargeable by energy generated from the energy generation device, and wherein the battery pack is useable to provide usable power to the pigging tool.

6. The pigging tool of claim 1, wherein the housing is a first module, wherein the pigging tool further comprises a second module that includes a diagnostic tool for collecting and storing pipeline health information.

7. The pigging tool of claim 6, further comprising a third module comprising a braking module, wherein a velocity of the pigging tool is controllable by the braking module through additional cups, wheels, or braking pads, and wherein friction generated from the braking module is usable for charging a battery pack to power the pigging tool.

8. A method comprising:
deploying, into a pipeline, a pigging tool comprising:
- a housing positionable in the pipeline and defining a bypass channel that extends along an axis that is nonparallel to a longitudinal axis of the housing;
- an energy generation device positionable in the bypass channel of the housing such that fluid is receivable by the energy generation device to generate energy for the pigging tool;
- an energy storage device for storing energy generated from the energy generation device and for providing the pigging tool with energy to perform one or more operations in the pipeline;

generating energy with the energy generation device by directing a fluid to the energy generation device using at least one pair of cups or baffles positioned on an external surface of the pigging tool, wherein the at least one pair of cups or baffles comprises a second bypass channel that extends through at least one cup or baffle of the at least one pair of cups or baffles; and
performing a pipeline operation with the pigging tool.

9. The method of claim 8, further comprising:
storing generated energy, by a battery pack, within an energy storage device coupled electrically to the energy generation device;
collecting and storing pipeline health information by an at least one data collecting module; and
transmitting pipeline health information electronically to a receiving module external to the pipeline.

10. The method of claim 9, further comprising:
adjusting the at least one pair of cups directionally with respect to the housing to alter an amount of fluid flowing through the at least one pair of cups wherein altering the amount of fluid flowing correlates to an amount of energy generated by the energy generation device.

11. The method of claim 9, wherein the generated energy charges a battery pack in the storage energy device, and wherein the battery pack provides power to the pigging tool.

12. The method of claim 8, wherein the energy generation device is a turbine comprising a shaft that is aligned with the longitudinal axis of the housing, and wherein the turbine is at least electrically coupled to an inverter to generate energy from a fluid directed from an at least one pair of cups.

13. The method of claim 8, wherein the housing is a first module, wherein the pigging tool further comprises a second module that includes a diagnostic tool for collecting and storing pipeline health information.

14. The method of claim 8, further comprising:
braking, by a braking module such that a velocity of the pigging tool is controlled by the braking module through additional cups, wheels, or braking pads, and wherein friction generated from the braking module is used for charging a battery pack to power the pigging tool.

15. A system comprising:
a pigging tool comprising:
- a housing positionable in a pipeline and defining a bypass channel that extends along an axis that is nonparallel to a longitudinal axis of the housing;
- an energy generation device positionable in the bypass channel of the housing such that fluid is receivable by the energy generation device to generate energy for the pigging tool;
- an energy storage device for storing energy generated from the energy generation device and for providing the pigging tool with energy to perform one or more operations in the pipeline; and
- at least one pair of cups or baffles positionable on an external surface of the pigging tool to control fluid flow to the energy generation device to generate energy, wherein the at least one pair of cups or baffles comprises a second bypass channel that extends through at least one cup or baffle of the at least one pair of cups or baffles; and a receiving module positioned external to the pipeline, the receiving module usable for providing operating instructions to the pigging tool and receiving pipeline health information from the pigging tool.

16. The system of claim 15, wherein
the second bypass channel extends along an axis that is nonparallel to a longitudinal axis of the at least one pair of cups.

17. The system of claim 16, wherein the at least one pair of cups are adjustable with respect to the housing of the pigging tool to alter an amount of fluid flowing through the second bypass channel, and wherein an amount of fluid flowing to the bypass channel of the housing correlates to an amount of energy generated by the energy generation device.

18. The system of claim 15, wherein the energy generation device is a turbine comprising a shaft that is aligned with the longitudinal axis of the housing, and wherein the turbine is at least electrically coupled to an inverter to generate energy from a fluid directed from an at least one pair of cups.

19. The system of claim 15, wherein the energy generation device is electrically coupled to the energy storage device that comprises a battery pack, wherein the battery pack is chargeable by energy generated from the energy generation device, and wherein the battery pack is useable to provide usable power to the pigging tool.

20. The system of claim 15, wherein the housing is a first module, wherein the pigging tool further comprises a second module that includes a diagnostic tool for collecting and storing pipeline health information, wherein the pigging tool further comprises a third module that includes a braking module, wherein a velocity of the pigging tool is controllable by the braking module through additional cups, wheels, or braking pads, and wherein friction generated from the braking module is usable for charging a battery pack to power the pigging tool.

* * * * *